(12) United States Patent
Hille et al.

(10) Patent No.: US 10,002,535 B1
(45) Date of Patent: Jun. 19, 2018

(54) DUAL-STAGE CAR FINDER

(71) Applicant: FORD GLOBAL TECHNOLOGIES, LLC, Dearborn, MI (US)

(72) Inventors: Kevin T. Hille, Plymouth, MI (US); John R. Van Wiemeersch, Novi, MI (US); Scott H. Gaboury, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/646,134

(22) Filed: Jul. 11, 2017

(51) Int. Cl.
| G08G 1/123 | (2006.01) |
| B60R 25/10 | (2013.01) |
| G01S 19/46 | (2010.01) |
| G01S 5/02 | (2010.01) |

(52) U.S. Cl.
CPC ............ *G08G 1/123* (2013.01); *G01S 5/0263* (2013.01); *G01S 19/46* (2013.01)

(58) Field of Classification Search
CPC . G08G 1/123; G08B 3/10; B60Q 1/26; B60Q 1/48; B60R 25/10; G01S 5/0263; G01S 19/46; H04Q 7/00
USPC .... 340/426.36, 539.11, 539.21, 539.23, 692, 340/988; 701/2, 468, 526, 538
See application file for complete search history.

(56) References Cited

U.S. PATENT DOCUMENTS

| 5,307,048 | A | * | 4/1994 | Sonders | .................. B60R 25/04 |
| | | | | | 180/287 |
| 5,933,074 | A | * | 8/1999 | Settles | ............... G07C 9/00182 |
| | | | | | 340/12.5 |
| 6,049,268 | A | * | 4/2000 | Flick | ...................... B60K 28/00 |
| | | | | | 340/12.54 |
| 6,927,685 | B2 | * | 8/2005 | Wathen | .............. G07C 9/00182 |
| | | | | | 340/426.13 |
| 7,170,419 | B2 | | 1/2007 | Masui | |
| 7,474,208 | B1 | | 1/2009 | Klein | |
| 7,561,030 | B2 | | 7/2009 | McBride et al. | |
| 8,994,548 | B2 | | 3/2015 | Gaboury et al. | |
| 9,412,274 | B2 | | 8/2016 | Lickfelt et al. | |
| 2009/0115639 | A1 | | 5/2009 | Proefke et al. | |
| 2015/0309767 | A1 | | 10/2015 | Osoinach et al. | |

FOREIGN PATENT DOCUMENTS

KR  20060000093 A  1/2006

OTHER PUBLICATIONS

Disclosed Anonymously 40842, Automotive Remote Keyless Entry System with On-Demand Audible Lock Confirmation Volume Control, 354/Research Disclosure, Apr. 1998

* cited by examiner

*Primary Examiner* — Hung T Nguyen
(74) *Attorney, Agent, or Firm* — Frank A. MacKenzie; MacMillan, Sobanski & Todd, LLC

(57) ABSTRACT

A vehicle location system includes a vehicle-based communication unit having a processor. The processor is configured to analyze request signals from a portable communication device. A first audible output device is configured to generate a first audible sound. A second audible output device is configured to generate a second audible sound. The sound generated by the second audible output device is a greater sound pressure than the first audible output device. The processor selectively enables one of the first audible output device and second audible output device based on the processor comparing a proximity characteristic of the request signals to a predetermined threshold.

20 Claims, 3 Drawing Sheets

DUAL-STAGE CAR FINDER

CROSS REFERENCE TO RELATED APPLICATIONS

Not Applicable.

STATEMENT REGARDING FEDERALLY SPONSORED RESEARCH

Not Applicable.

BACKGROUND OF INVENTION

The present invention relates generally to locating a vehicle.

Functionality of vehicle key fobs typically includes a vehicle lock function, unlock function, trunk unlatch, and panic alarms. Vehicle owners further utilize their key fobs to locate their vehicle. Most vehicle key fobs and vehicles include functionality such that when the vehicle is parked in a crowded parking lot, the lock button on the fob may be pressed to actuate an audible device mounted on the vehicle to locate the vehicle. Historically, when attempting to locate a vehicle in a crowded parking lot, the vehicle owner has traditionally relied on either pressing a panic button or double pressing a lock button on a key fob to activate either the vehicle alarm system or a soft chirp respectively. The vehicle owner may then listen for the audible response produced by the vehicle to locate the vehicle. However, the panic and lock button were not designed or intended for such use. The panic button was designed to be intentionally loud and harsh to draw attention and alert others to the vehicle. Using the panic button as a car finder in this fashion makes the alarm system less effective due to the high usage and annoyance of triggering the alarm and it also reduces the life of the horn which most commonly is shared also as the traffic horn. The chirp from pressing the lock button was designed to be soft and pleasing to the listener to confirm that the vehicle is locked, and thus, may not be loud enough to be heard from a distance.

U.S. Pat. No. 8,994,548 issued on Mar. 31, 2015 describes the use of an electronic device (e.g., piezoelectric element used as a sounder) in which a more pleasing sound to driver may be used as opposed to a panic alarm. The sounder is capable of generating a softer more pleasing sound on the depression of a respective button as opposed to a panic alarm. As the respective button is pushed a second time, the duration and noise level emitted from the sounder increases. The issue is that if the user is not close (e.g., within 30-40 meters), the user cannot hear the sound emitted from the sounder. As a result, a user may then manually revert to the panic button to generate the louder but annoying sound. The electric field created by the large currents required to drive the panic horn also make it difficult to receive signals from the fob requiring the user to walk closer to the vehicle and thus prolonging the use of the horn and the annoying sound. This creates non-use of the designated sound, reduced life of the horn, as well as customer dissatisfaction with the use of the fob.

SUMMARY OF INVENTION

In one aspect of the invention, the embodiments described herein provide an advantage of determining a location between a portable communication device and a vehicle-based communication unit, and selectively enabling a sound pressure from either a first audible output device or a second audible output device based on a proximity factor therebetween. The first audible output device is independent of the second audible output device whereas the first audible output device outputs a sound pressure lower and of different pitch, quality, and pattern than that of the second audible output device. The system utilizes a proximity characteristic derived through data of a received vehicle function request signal and compares the proximity characteristic to a proximity threshold for determining a relative location of the portable communication device to the vehicle-based communication unit. Based on whether the proximity threshold is exceeded, a determination is made whether to output sound pressure from either the first audible output device or second audible output device. Moreover, if respective request signal is received by the vehicle-based communication unit within a predetermined duration of time from a previous received request signal, the respective output device may increase the sound pressure output and/or may increase the duration of time that the sound pressure is being output by the respective device. Proximity characteristics may include, but is not limited to, received signal strength indicators, GPS location, time-of-flight information, and number of request signals.

An embodiment contemplates a vehicle communication device including a processor analyzing request signals from a portable communication device. A first audible device generates a first sound. A second audible device generates a second sound. The second audible device outputting a sound greater than the first audible device. The processor selectively enables one of the first audible device and second audible device based on comparing a proximity characteristic of the request signals to a threshold.

An embodiment contemplates a system comprising a vehicle-based communication unit including a processor. The processor is configured to analyze request signals from a portable communication device. A first audible output device is configured to generate a first audible sound. A second audible output device is configured to generate a second audible sound. The sound generated by the second audible output device is a greater sound pressure than the first audible output device. The processor selectively enables one of the first audible output device and second audible output device based on the processor comparing a proximity characteristic of the request signals to a predetermined threshold.

DETAILED DESCRIPTION

Figure 1:
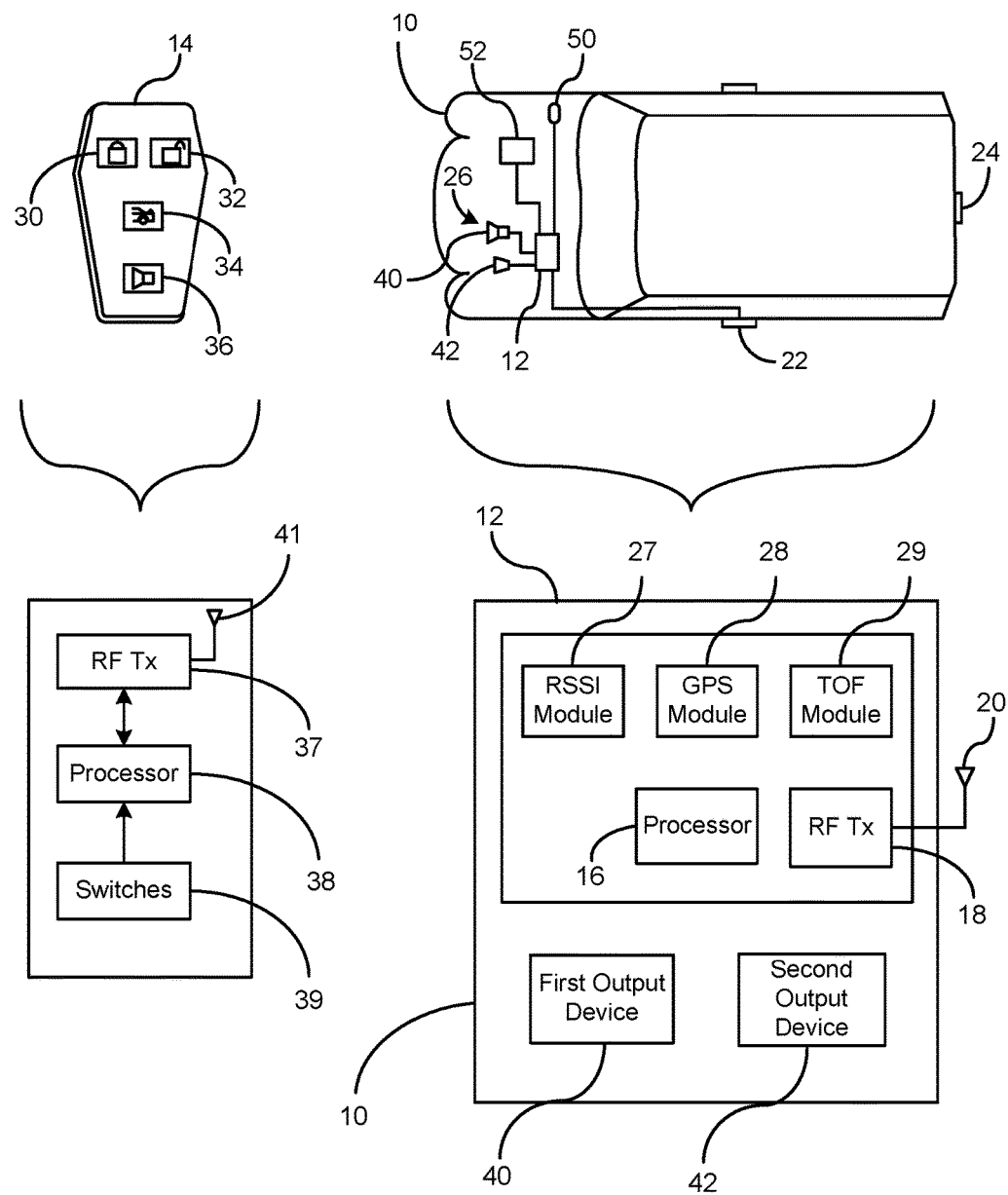
FIG. 1 illustrates a block diagram of a dual-device vehicle detector system for a vehicle.

Referring to FIG. 1, an exemplary dual-device vehicle detector system for a vehicle 10 is shown. The system includes a vehicle-based communication unit 12 mounted on the vehicle 10 and is in wireless communication with a portable communication device 14. The vehicle-based communication unit 12 may be packaged, for example, in a vehicle engine compartment, a vehicle instrument panel or any other location that optimizes communication with the portable communication device 14.

The vehicle-based communication unit 12 is an electronic control unit that includes, but is not limited to, a processor 16, and a transceiver 18. Alternatively, a transmitter and receiver may be used in place of the transceiver 18. The transceiver 18 is coupled to an antenna 20 mounted on a vehicle door, a side view mirror housing, an engine compartment, or other locations suitable for good performance. The vehicle-based communication unit 12 is in communication with a plurality of peripheral devices including, but not limited to, door actuator devices 22, trunk unlatching devices 24, and alarm devices 26. The vehicle-based communication unit 12 further includes a received signal strength indicator (RSSI) module 27, a global positioning system (GPS) module 28, and time-of-flight (TOF) module 29.

The portable communication device 14, also referred to as a remote keyless entry (RKE) fob, broadcasts RF signals to the vehicle-based communication unit 12 for remotely actuating the various functions of the vehicle including, but not limited to, vehicle door locking, vehicle door unlocking, trunk unlatching, and alarm activation. The portable communication device 14 includes interface buttons on a face of the portable communication device 14 for actuating a request signal for enabling the respective vehicle function. For example, a door lock switch 30 transmits wireless signals for locking the vehicle door. A door unlock switch 32 transmits wireless signals for unlocking the vehicle door. A trunk unlatch switch 34 transmits wireless signals for unlatching a trunk or liftgate. An alarm switch 36 transmits wireless signals for activating and deactivating a vehicle alarm. The portable communication device 14 broadcasts the RF signals typically at a maximum power level that is regulated by the Federal Communications Commission (FCC). It should be understood that the RF signals broadcast may include Bluetooth and UWB, The RF signals are received by the portable communication device 14 when the vehicle-based communication unit 12 is within broadcasting range of the portable communication device 14 and the RF signals are authenticated before a vehicle function is activated. While the portable communication device 14 is described herein as a RKE fob, the portable communication device 14 may include, but is not limited to, a phone, smartphone, or any other portable device that can broadcast signals directly to the vehicle or indirectly using an intermediary system such as a cloud.

The portable communication device 14 further includes a processor 38 that is coupled to the interface buttons that include separate switches 39 for actuating the various RKE commands. The portable communication device 14 further includes a transceiver 37 coupled to an antenna 41. The antenna 41 functions as both a receiving antenna for intercepting RF energy and delivering the signal to the transceiver 37 for signal processing, and also functions as a transmitting antenna for obtaining signals from the transceiver 37 and generating an RF field for signal transmission.

A respective RKE command is initiated by depressing a respective interface button on the portable communication device 14 which results in a signal being broadcast wirelessly via the RF transceiver 37 and the antenna 41 to the vehicle-based communication unit 12 requesting execution of the vehicle function associated with the respective interface button.

A respective function associated with the door lock function occurs when the lock button is pressed twice within a short unit of time (ex., 3 seconds) and an audible sound is produced verifying that the vehicle is locked. Users have also often utilized this function as a vehicle locator when the vehicle is parked in a crowded parking lot (e.g., shopping mall, sports event, etc.). The system as described herein utilizes a first audile output device 40 and a second audible output device source 42 that are distinct and independent of one another. The second audible output device 42 generates a sound pressure decibel level that is greater than the first audible output device 40. The first audible output device 40 is different than the second audible output device 42 such that sound output by the respective device may be different in at least one of pitch, quality, and pattern. For example, the first audible output device 40 may include, but is not limited to, a piezoelectric device, whereas the second audible output device 42 may include, but is not limited to a horn. The second audible output device 42, however, generates a higher sound pressure than the first audible output device 40. As a result, either the first audible output device 40 or second audible output device 42 may be selected for generating the sound based on an exceeded threshold, or switching may dynamically occur between the first audible output device 40 and the second audible output device 42 based on the exceeded threshold. The exceeded threshold may include, but is not limited to, a predetermined number of times a respective button on the portable communication device 14 is pressed, a RSSI threshold, a GPS differential threshold, or a time-of-flight threshold that determines the distance of device 14 from the vehicle 10.

In one exemplary configuration, a respective button (e.g., lock button) is pressed subsequently twice within a respective time (e.g., 3 seconds). The subsequent actuation of the respective button activates the first audible output device 40 of the vehicle 10. An audible sound is generated by the first audible output device 40 having a predetermined sound pressure for a predetermined duration of time. Subsequently, if the respective button is pressed subsequently within a predetermined duration of time from a previous button press, then the sound pressure generated by the first audible output device 40 is increased. In addition, the duration of time that the sound pressure is output by the first audible output device 40 may be extended. Moreover, if the respective button is subsequently pressed within the predetermined duration of time of a previous button press, then the sound pressure of the first audible output device 40 will increase by a predetermined amount, and the duration of time that the sound pressure is output by the first audible output device 40 may also be extended. Subsequent activations of the respective button with a predetermined duration of time may continuously increase both the sound pressure generated by the first audible output device 40 as well as the duration of time that the sound pressure is output until the predetermined threshold is exceeded. If the number of times the respective button is pressed reaches the predetermined threshold, then the second audible output device 42 is enabled for generating sound pressure for each subsequent button press. That is, each time the respective button is subsequently pressed within the predetermined duration of time from a previous button press, the second audible output device 42 generates a respective sound pressure. It should be understood that similar to first audible output device 40, the sound pressure generated by the second audible output device 42 and/or the duration of time that the sound pressure is generated by the second audible output device 42 may be increased when a subsequent button is pressed when the predetermined duration of time from the previous button actuation.

In yet another configuration, the predetermined threshold may be based on the received signal strength from the RSSI module 27. Received signal strength is obtained by a receiving circuit of the vehicle-based communication unit 12 that identifies a signal strength of a respective received message. When the signal is received by the transceiver 18 of the vehicle-based communication unit 12, the RSSI module 27 measures the signal strength of the received signal. The RSSI is an indication of the power of the received signal, which provides an indication of a proximity of the portable communication device 14 to the vehicle-based communication unit 12. The higher the RSSI value, the closer the communicating devices are to one another. To utilize the RSSI, the signal strength as determined by the RSSI module 27 is used to correlate a relative distance between the vehicle-based communication unit 12 and the portable communication device 14. Depending on whether the RSSI value exceeds the predetermined threshold, the vehicle-based communication unit 12 would determine whether the first audible output device 40 or the second audible output device 42 should be utilized. For example, if the RSSI value is higher than a RSSI threshold value, then the determination is made that the communication devices are within a respective distance of one another where the first audible output device 40 is used. Alternatively, if the RSSI value is less than the RSSI threshold value, then the determination is made that the communication devices are not within a respective distance of one another where the second audible output device 42 would be used. It should be understood that the sound from a second device 42 may be mathematically or empirically verified to be significantly audible at the greater distance corresponding to the RSSI thresholds and that the first audible output device 40 is mathematically or empirically verified to not be audible at the lower RSSI threshold.

In a respective situation where the driver is either approaching the vehicle or leaving the vehicle, a respective button is pressed and the signal is transmitted from the portable communication device 14 to the vehicle-based communication unit 12. Upon receipt of the signal, the RSSI module 27 within the vehicle-based communication unit 12 determines the signal strength of the received signal. If the RSSI value is above a respective RSSI threshold, then the determination is made that the portable communication device 14 is within a respective distance of the vehicle where the first audible output device 40 is used. The first audible output device is preferably a more subtle and pleasing sound in comparison to the sound output by the second audible output device 42. The RSSI value exceeding the predetermined threshold is correlated to a distance where the user is within a respective distance of the vehicle and the sound generated by the first audible output device 40 can be heard. As the user continues to press the respective button, the RSSI check for each signal received and a determination will be made as to whether the RSSI value for each signal is greater or less than the RSSI threshold. If the RSSI value is less than the RSSI threshold, then the second audible output device 42 will be utilized to generate a sound that is louder and distinct from the sound generated by the first audible output device 40. It should be understood that if any subsequent signals that indicate that the RSSI value received by the vehicle-based communication unit indicate that the RSSI is greater than the RSSI threshold, then the system will switch between outputting a sound from the second audible output device 42 to outputting a sound from the first audible output device 40. For example, if a user initially presses a respective button and the vehicle-based communication unit determines that the RSSI value is less that the RSSI threshold, then a sound will be output by the second audible output device 42. Subsequently, if the user presses the respective button and the RSSI value is greater that the RSSI threshold, then this indicates that the user has moved to a closer range of the vehicle and that the sound from the first audible output device 40 can be heard by the user. The vehicle will output the sound from the first audible output device 40 which is a more subtle and pleasing sound in comparison to the sound from the second audible output device. Alternatively, the sound output may transition from the first audible output device 40 to the second audible output device 42 if the user transitions from a region where the RSSI value exceeds the RSSI threshold to a regions where the RSSI value is less than the RSSI threshold.

In addition, while a user is in a respective region where the RSSI value is either less than or greater than the RSSI threshold, if a user presses the button subsequently with a predetermined duration of time from a previous button push, then each subsequent push may increase the loudness of the respective output device as well as the duration that the sound is being output. For example, if a determination is made that the user is in a region where each consecutive push of the respective button results in the RSSI being greater than the predetermined threshold, then for each subsequent button pressed within a predetermined time from a previous button pressed where each RSSI value for each signal transmitted remains greater than the RSSI threshold, the sound pressure output by the first audible output device will be greater than the previous sound pressure output by the first audible output device. Moreover, the duration that the sound is being output may also increase with each subsequent button push. The same process can be used while a user presses the respective button subsequently within the region that results in the RSSI value being less than the RSSI threshold.

Another configuration is that the RSSI threshold value may be adjusted based on either measured noise levels or areas where noise levels are expected to be high. In one example, the vehicle hands-free microphone 50 can be activated when the user presses the respective button. The hands-free microphone will receive and analyze the ambient noise captured by the hand-free microphone. Based on the analyzed results, the processor 16 within the vehicle-based communication unit will adjust the RSSI threshold. That is, if the ambient noise exceeds a predetermined ambient noise threshold, then the processor 16 will adjust the RSSI threshold such that the second audible output device 42 will be enabled quicker if increased ambient noise levels exceed an ambient noise level threshold.

Another configuration is that the RSSI threshold value may be adjusted if the vehicle is parked in an area that is expected to have increased ambient noise levels. Examples of parking lots that have increased ambient noise level above the predetermined ambient noise level threshold include, but are not limited to, airports, shopping centers, areas next to highways or major roads, stadiums, amusement parks. Similarly, GPS coordinates or other data may be compared to a map database to determine if the parking lot is in an area that has increased ambient noise levels.

Another configuration could utilize temperature data to adjust the output of the first audible output device 40 and the second audible output device 42. For example, sound travels farther in colder conditions. Therefore, the system adjusts to the audible output devices could be based on a temperature measurement, time of year (e.g., winter vs. summer), or time of day (day vs. night).

Another configuration could utilize GPS data. If the portable communication device 14 is a device that includes GPS capability (e.g., smartphone), then the vehicle could compare the GPS location of the phone and the GPS location of the vehicle for determining a relative distance therebetween for triggering either the first audible output device 40 and the second audible output device 42. If the vehicle includes a GPS module 52, then as the user exits the vehicle the GPS coordinate of the vehicle is stored in a vehicle memory. Alternatively, if the vehicle does not have a GPS module, the vehicle-based communication unit 12 communicates with the portable communication device 14 (i.e., smartphone) and the GPS coordinates of the portable communication device 14 are communicated and stored to a vehicle memory thereby providing the vehicle with its own GPS coordinate. Thereafter, whenever the respective button is pressed on the portable communication device 14, a signal is transmitted to the vehicle-based communication unit 12 that includes the portable communications device's current GPS coordinates, and the processor 16 compares the transmitted GPS coordinates with the stored GPS coordinates. Based on whether the relative distance between the portable communication device and the vehicle-based communication unit 12, as determined by the comparing GPS coordinates, exceeds the predetermined distance threshold will determine whether the first audible output device 40 or the second audible output device 42 is used. In cases where the portable communication device 14 is a smartphone, it may communicate directly with the vehicle via Bluetooth, WiFi or other wireless solutions and/or it may also be able to send car finder commands via cellular (eg. Phone communicates to cloud and cloud communicates to vehicle). In cases where a cellular car finder command was issued, it may be sufficient to jump straight to second audible output device 42. It should be understood that the sound from a second device 42 may be mathematically or empirically verified to be significantly audible at the greater distance corresponding to the distance thresholds as determined by the GPS location and that the first audible output device 40 is mathematically or empirically verified to not be audible at the lower distance threshold as determined by the GPS location.

Another configuration utilizes time-of-flight (ToF) to determine whether to use the first audible output device 40 or the second audible output device 42. Time-of-flight is a technique that measures the time for an object, particle or acoustic, electromagnetic, or other wave to travel a distance through a medium. Since the ToF provides an estimate with high precision, this measurement can be used to estimate the ability of the user to hear the enabled audible output device. For example, utilizing a portable communication device's Ultra-Wide Band radio technology or other radio technology, relative distance can be determined between the portable communication device 14 and the vehicle 10 or the relative distance can be determined between the first audible output device 40 and the second audible output device 42 by determining the ToF. A determination is thereafter made as to whether ToF measurement exceeds a predetermined ToF threshold for determining which audible output device to use.

It should be understood that the sound from a second audible output device 42 may be mathematically or empirically verified to be significantly audible at the greater distance corresponding to the distance thresholds as determined by the TOF measurement and that the first audible output device 40 is mathematically or empirically verified to not be audible at the lower distance threshold as determined by the TOF measurement.

Figure 2:
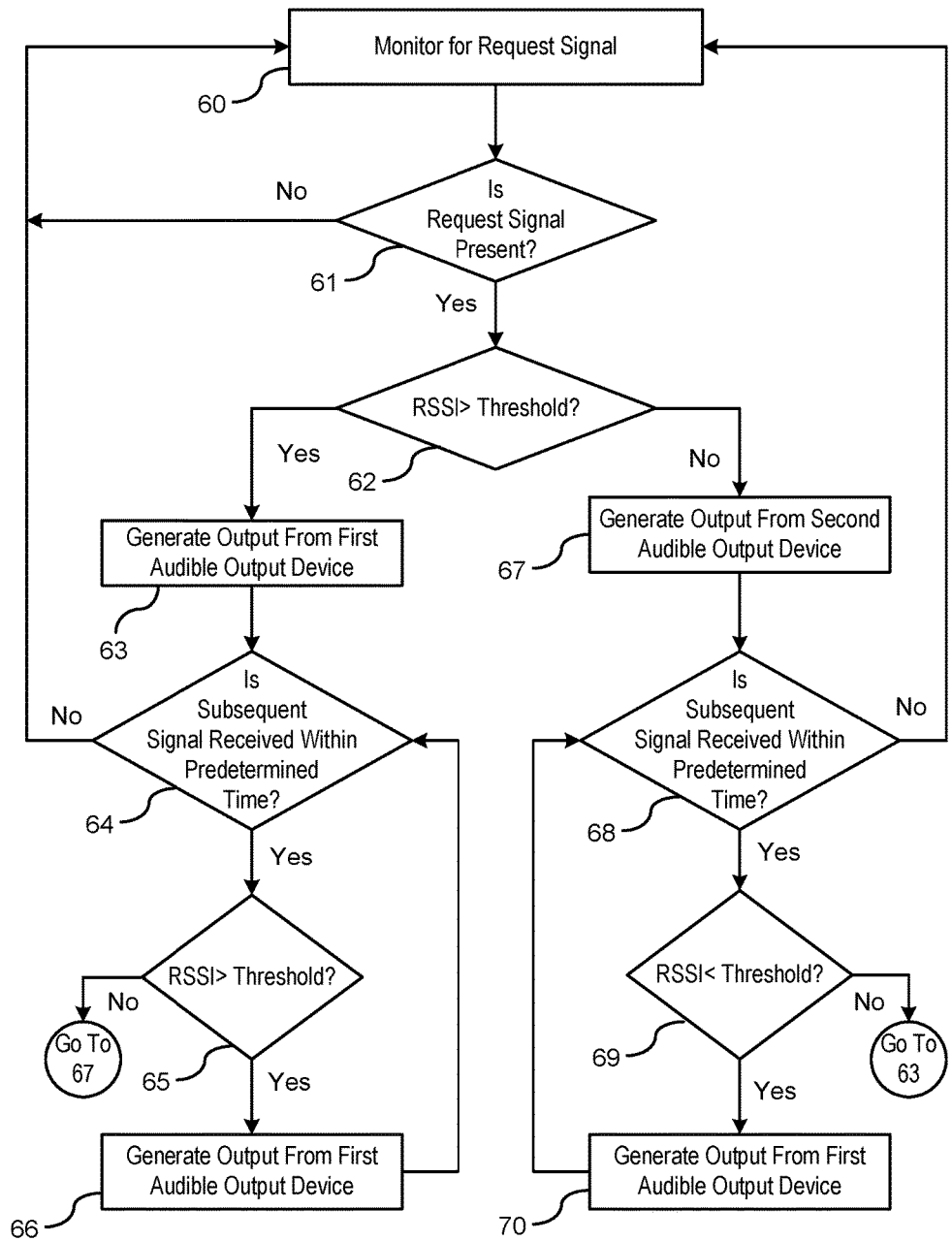
FIG. 2 is a flowchart for locating a vehicle as a function of RSSI.

FIG. 2 illustrates a flowchart for a method for actuating a respective audible output device for locating a vehicle based on the received signal strength of the transmitted signal from the portable communication device.

In step 60, the vehicle-based communication unit is enabled for monitoring incoming signals from the portable communication device.

In step 61, a determination is made whether a request signal is received from the portable communication device. If a request signal is received, then the routine proceeds to step 62, otherwise, the routine returns to 60.

In step 62, the RSSI value of the signal is obtained and a determination is made whether the RSSI value is greater than the RSSI threshold. If the RSSI value is greater than the predetermined threshold, then the routine proceeds to step 63; otherwise, the routine proceeds to step 67.

In step 63, a sound from the first audible output device is generated in response to the RSSI being greater than the RSSI threshold. The first audible output device generates a sound pressure lower relative to the second audible output device.

In step 64, a determination is made as to whether a subsequent request signal generated by the portable communication device is received by the vehicle-based communication unit within a predetermined time of the previous request signal. If a subsequent signal is received within the predetermined time, then the routine proceeds to step 65; otherwise, the routine returns to step 60 to monitor for request signals.

In step 65, a determination is made whether the RSSI value is greater than the RSSI threshold. If the determination is made that the RSSI value is greater than the RSSI threshold, the routine proceeds to step 66. If the determination is made that the RSSI threshold is less than the RSSI threshold, then the routine proceeds to step 67 where the second audible output device is used.

In step 66, a sound is generated by the first output device at an increased sound pressure from the previous sound output. The sound output by the first audible output device may be greater in sound pressure and/or greater in duration than the previous sound output by the first audible output device. Thereafter, the routine returns to step 64 to determine whether a subsequent request signal is received by the portable communication.

Referring to step 67, in response to a determination in step 62 or step 65 that the sound pressure is less than the RSSI threshold, a sound from the second audible output device is generated in response to the RSSI being less than the RSSI threshold. The second audible output device generates a sound pressure greater than the second audible output device.

In step 68, a determination is made as to whether a subsequent request signal generated by the portable communication device is received by the vehicle-based communication unit within a predetermined time of the previous request signal. If a subsequent signal is received within the predetermined time, then the routine proceeds to step 69; otherwise, the routine returns to step 60 to monitor for request signals.

In step 69, a determination is made whether the RSSI value of the subsequent is less than the RSSI threshold. If the determination is made that the RSSI value is less than the RSSI threshold, the routine proceeds to step 70. If the determination is made that the RSSI threshold is greater than the RSSI threshold, then the routine proceeds to step 63 where the first audible output device is used.

In step 70, in response to the determination that the RSSI is greater than the RSSI threshold, a sound is generated by the second output device at an increased sound pressure from the previous sound output. The sound output by the second audible output device may also be greater in duration than the previous sound output by the second audible output device. Thereafter, the routine returns to step 68 to determine whether a subsequent request signal is received by the portable communication.

Figure 3:
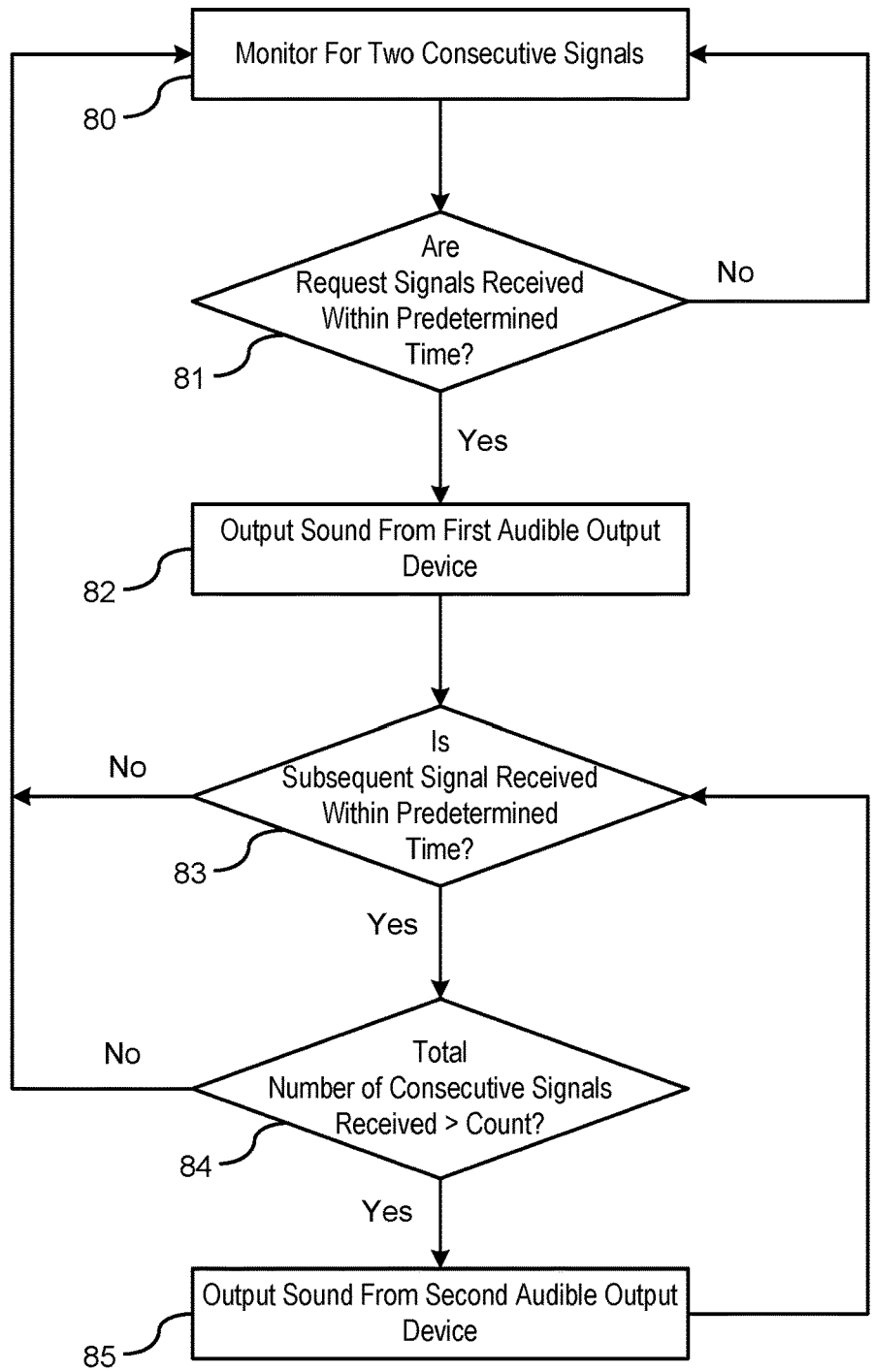
FIG. 3 is a flowchart for locating a vehicle as a function of number of received request signals.

FIG. 3 illustrates a flowchart for a method for actuating a respective audible output device for locating a vehicle based on a number of subsequent inputs on the portable communication device by a user.

In step 80, the vehicle-based communication unit monitors for two consecutive request signals from the portable communication device within the predetermined period of time.

In step 81, a determination is made whether two consecutive request signals are received within the predetermined period of time of one another. The two consecutive request signals are present, then the routine proceeds to step 82; otherwise, the routine returns to step 80.

In step 82, an audible sound pressure is output by the first audible output device.

In step 83, a determination is made whether a subsequent request signal is received from the portable communication device within a predetermined period of time from the previous request signal. If the request signal is received within the predetermined period of time, the routine proceeds to step 84; otherwise, the routine returns to step 80.

In step 84, a determination is made whether the total number of consecutive received request signals, each received within the predetermined period of time from each previous request signal, is greater than a predetermined request threshold. If the number of consecutive received request signals is greater than the predetermined request threshold, then the routine proceeds to step 85; otherwise, the routine returns to step 80.

In step 85, in response to the number of consecutive received request signals exceeding the predetermined request threshold, the sound is output by the second audible output device. The second audible output device has a sound pressure greater than the first audible output device. The routine returns to step 83.

While certain embodiments of the present invention have been described in detail, those familiar with the art to which this invention relates will recognize various alternative designs and embodiments for practicing the invention as defined by the following claims.

What is claimed is:

1. A vehicle location system comprising:
a vehicle-based communication unit including a processor, the processor configured to analyze request signals from a portable communication device;
a first audible output device configured to generate a first audible sound;
a second audible output device configured to generate a second audible sound, the sound generated by the second audible output device being a greater sound pressure decibel level than the first audible output device;
the first audible output device is different than the second audible output device which that sound output by the respective device may be different in at least one of pitch, quality, and pattern; and
wherein the processor selectively enables one of the first audible output device and second audible output device based on the processor comparing a proximity characteristic of the request signals to a predetermined threshold from the portable communication device.

2. The system of claim 1 wherein the proximity characteristic of the request signals include a received signal strength indicator (RSSI) and the predetermined threshold is a RSSI threshold value, wherein the RSSI is determined each time a request signal is received at the vehicle-based communication unit from the portable communication device.

3. The system of claim 2 wherein the processor enables the first audible output device when the RSSI is greater than the RSSI threshold, and wherein the processor enables the second audible output device when the RSSI is less than a RSSI threshold.

4. The system of claim 3 wherein the sound pressure of the first audible output device is incrementally increased in response to a subsequent request signal being received by the vehicle-based communication unit within a predetermined duration of time of a previous request signal received by the vehicle-based communication unit.

5. The system of claim 3 wherein a duration that the sound pressure is output by the first audible device is incrementally increased in response to a subsequent request signal being received by the vehicle-based communication unit within a predetermined duration of time of a previous request signal received by the vehicle-based communication unit.

6. The system of claim 3 wherein the sound pressure of the second audible output device is incrementally increased in response to a subsequent request signal being received by the vehicle-based communication unit within a predetermined duration of time of a previous request signal received by the vehicle-based communication unit.

7. The system of claim 3 wherein a duration that the sound pressure is output by the second audible device is incrementally increased in response to a subsequent request signal being received by the vehicle-based communication unit within a predetermined duration of time of a previous request signal received by the vehicle-based communication unit.

8. The system of claim 2 wherein the proximity characteristic of the request signals include a GPS location and the predetermined threshold is a distance threshold value, wherein a distance between the portable communication device to the vehicle-based communication unit is based on a function of a GPS location of the portable communication device and a GPS location of the vehicle-based communication unit, and wherein a GPS location of the portable device is communicated in each request signal received by the vehicle-based communication unit.

9. The system of claim 8 wherein the vehicle-based communication unit receives the vehicle GPS location from a GPS module within the vehicle.

10. The system of claim 8 wherein the vehicle-based communication unit utilizes the GPS location of the portable communication device for the vehicle GPS location prior to the portable communication device exiting the vehicle.

11. The system of claim 8 wherein the processor enables the first audible output device when the distance between the vehicle GPS location and the GPS location of the portable communication device is less than the distance threshold.

12. The system of claim 8 wherein the processor enables the second audible output device when the distance between the vehicle GPS location and the GPS location of the portable communication device is less than the distance threshold.

13. The system of claim 1 wherein the wherein the proximity characteristic of the request signals include a request signal count and the predetermined threshold is a predetermined count value, wherein the request signal count is incremented each time a respective request signal is received within a predetermined duration of time of a previous request signal.

14. The system of claim 13 wherein the processor enables the first audible output device when the request signal count is less than the predetermine count, and wherein the processor enables the second audible output device when the request signal count is greater than the predetermined count.

15. The system of claim 14 wherein the sound pressure of the first audible output device is incrementally increased in response to subsequent request signal being received by the vehicle-based communication unit within the predetermined duration of time of the previous request signal received by the vehicle-based communication unit.

16. The system of claim 15 wherein the sound pressure of the second audible output device is incrementally increased in response to subsequent request signal being received by the vehicle-based communication unit within the predetermined duration of time of the previous request signal received by the vehicle-based communication unit.

17. The system of claim 1 wherein the predetermined threshold is adjusted in response to measured noise levels of a location of a parked vehicle.

18. The system of claim 1 wherein the predetermined threshold is adjusted in response to temperature levels of a location of a parked vehicle.

19. The system of claim 1 wherein the proximity characteristic of the request signals include a Time of Flight indicator (ToF) and the predetermined threshold is a ToF threshold value, wherein the ToF is determined each time a request signal is received at the vehicle-based communication unit from the portable communication device.

20. A vehicle location system comprising:
a vehicle communication unit including a processor analyzing request signals from a portable communication device;
a first audible device for generating a first audible sound;
a second audible device for generating a second audible sound, the second audible device for outputting a greater sound pressure decibel level than the first audible device;
the first audible device is different than the second audible device which that sound output by the respective device may be different in at least one of pitch, quality, and pattern; and
wherein the processor selectively enables one of the first audible device and second audible device based on comparing a proximity characteristic of the request signals to a predetermined threshold from the portable communication device.

* * * * *

UNITED STATES PATENT AND TRADEMARK OFFICE
CERTIFICATE OF CORRECTION

Page 1 of 2

PATENT NO. : 10,002,535 B1
APPLICATION NO. : 15/646134
DATED : June 19, 2018
INVENTOR(S) : Kevin T. Hille, John R. Van Wiermeersch and Scott H. Gaboury It is certified that error appears in the above-identified patent and that said Letters Patent is hereby corrected as shown below:

In the Claims

Column 9, Claim 1, Line 46, delete "vehicle location".

Column 9, Claim 1, Line 55, delete "decibel level".

Column 9, Claim 1, Line 57-60, delete "the first audible output device is different than the second audible output device which that sound output by the respective device may be different in at least one of pitch, quality, and pattern; and".

Column 9, Claim 1, Line 65, delete "from the portable communication device".

Column 12, Claim 20, Line 7, delete "vehicle location".

Column 12, Claim 20, Line 11, after "device" delete "for", and after "generating a first" delete "audible".

Column 12, Claim 20, Line 12, after "device" delete "for", and after "generating a second" delete "audible".

Column 12, Claim 20, Line 13, after "device" delete "for".

Column 12, Claim 20, Line 13-14, after "outputting" delete "a greater sound pressure decibel level" and insert --a sound greater--.

Column 12, Claim 20, Lines 16-19, delete "the first audible device is different than the second audible device which that sound output by the respective device may be different in at least one of pitch, quality, and pattern; and".

Signed and Sealed this
Twenty-first Day of August, 2018

Andrei Iancu
*Director of the United States Patent and Trademark Office*

Column 12, Claim 20, Line 23, delete "predetermined".

Column 12, Claim 20, Lines 23-24, delete "from the portable communication device".